United States Patent
Gladfelter et al.

(10) Patent No.: US 6,963,031 B2
(45) Date of Patent: Nov. 8, 2005

(54) SLEEVE ASSEMBLY FOR RECEIVING ELONGATED ITEMS WITHIN A DUCT

(75) Inventors: Harry F. Gladfelter, Kimberton, PA (US); Paul J. Matte, Chester Springs, PA (US); Patrick M. Pendergast, Malvern, PA (US); Dawn D. Ross, West Chester, PA (US)

(73) Assignee: Federal -Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/651,198

(22) Filed: Aug. 28, 2003

(65) Prior Publication Data

US 2004/0084203 A1 May 6, 2004

Related U.S. Application Data

(60) Provisional application No. 60/406,607, filed on Aug. 28, 2002, and provisional application No. 60/476,939, filed on Jun. 9, 2003.

(51) Int. Cl.[7] .................................................. H02R 3/06
(52) U.S. Cl. ...................................... 174/74 A; 174/93
(58) Field of Search ............................... 174/74 A, 93, 174/95; 138/177, 108, 121, 123

(56) References Cited

U.S. PATENT DOCUMENTS

| | | | |
|---|---|---|---|
| 2,585,054 A | 2/1952 | Stachura ...................... | 174/36 |
| 3,939,875 A | 2/1976 | Osborn et al. .............. | 138/178 |
| 4,095,042 A | 6/1978 | Ross ........................... | 174/36 |
| 4,478,661 A | 10/1984 | Lewis ......................... | 156/92 |
| 4,582,093 A | 4/1986 | Hubbard et al. ............ | 138/111 |
| 4,674,167 A | 6/1987 | Hubbard et al. ............ | 29/401.1 |
| 4,684,762 A | 8/1987 | Gladfelter ................... | 174/36 |
| 4,741,593 A | 5/1988 | Fochler .................... | 350/96.23 |
| 4,754,685 A | 7/1988 | Kite et al. ..................... | 87/9 |
| 4,862,922 A | 9/1989 | Kite, III ..................... | 138/119 |
| 4,891,256 A | 1/1990 | Kite, III et al. ............ | 428/36.1 |
| 4,946,722 A | 8/1990 | Moyer ........................ | 428/36.1 |
| 4,989,422 A | 2/1991 | Barlow et al. ............... | 66/170 |
| 5,027,864 A | 7/1991 | Conti et al. ................. | 138/177 |
| 5,029,815 A | 7/1991 | Kumpf ..................... | 254/134.3 |

(Continued)

FOREIGN PATENT DOCUMENTS

| | | | |
|---|---|---|---|
| FR | 2 492 603 | 4/1982 | ............ H02G/3/04 |
| FR | 207 093 | 6/2002 | |

(Continued)

OTHER PUBLICATIONS

Carlon® Flexible Raceway Systems brochure, 16 pages, dated 2001.

(Continued)

*Primary Examiner*—Chau N. Nguyen
(74) *Attorney, Agent, or Firm*—Synnestvedt & Lechner LLP

(57) ABSTRACT

A sleeve assembly for receiving and protecting elongated items within a duct is disclosed. The sleeve assembly includes a plurality of separate and independent sleeves, each sleeve being woven from warp and weft filamentary members that form sidewalls surrounding and defining a central space. Pull cords are located within each central space for drawing the elongated items through the sleeves once positioned within a duct. The assembly includes means for drawing the sleeves simultaneously through the duct, such means including an outer jacket surrounding the sleeves, the jacket having an inwardly facing surface that exerts a compressive force on the sleeves causing them to be drawn through the duct together with the jacket. The means may also include a loop which attaches the sleeved together at one end. The sleeves may be biased into an open or a substantially flattened configuration.

9 Claims, 4 Drawing Sheets

U.S. PATENT DOCUMENTS

| | | | |
|---|---|---|---|
| 5,074,527 A | 12/1991 | Kumpf | 254/134.3 |
| 5,178,923 A | 1/1993 | Andrieu et al. | 428/36.1 |
| 5,234,198 A | 8/1993 | Hale et al. | 254/134.4 |
| 5,289,556 A | 2/1994 | Rawlyk et al. | 385/112 |
| 5,300,337 A | 4/1994 | Andrieu et al. | 428/36.1 |
| 5,413,149 A | 5/1995 | Ford et al. | 138/123 |
| 5,480,203 A | 1/1996 | Favalora et al. | 294/86.42 |
| 5,556,495 A | 9/1996 | Ford et al. | 156/148 |
| 5,587,115 A | 12/1996 | Allen | 264/1.24 |
| 5,613,522 A | 3/1997 | Ford et al. | 138/123 |
| 5,822,485 A | 10/1998 | Nelson et al. | 385/112 |
| 5,843,542 A * | 12/1998 | Brushafer et al. | 428/36.1 |
| 5,969,295 A | 10/1999 | Boucino et al. | 174/113 C |
| 6,005,191 A | 12/1999 | Tzeng et al. | 174/102 R |
| 6,240,968 B1 | 6/2001 | Bigonzi-Jaker et al. | 138/115 |
| 6,251,201 B1 | 6/2001 | Allen | 156/47 |
| 6,262,371 B1 | 7/2001 | Allen | 174/68.1 |
| 6,304,698 B1 | 10/2001 | Morris | 385/100 |
| 6,398,190 B1 | 6/2002 | Li | 254/134.4 |
| 6,421,485 B2 | 7/2002 | Morris | 385/100 |

FOREIGN PATENT DOCUMENTS

| | | | | |
|---|---|---|---|---|
| GB | 2 250 385 | 6/1992 | | H02G/1/08 |
| JP | 59-189507 | 10/1984 | | H01B/7/18 |
| JP | 61-141918 | 9/1986 | | H02G/3/04 |
| JP | 62-51913 | 3/1987 | | H02G/3/04 |
| JP | 2-37516 | 3/1990 | | H02G/3/04 |
| JP | 07-274336 | 10/1995 | | H02G/1/08 |

OTHER PUBLICATIONS

Douglas Material Specification Qualified Product List, DMS QPL 2379, Issue No. 2, dated Mar. 13, 1996, 13 pages.

Douglas Material Specification, DMS 2379A, dated Mar. 13, 1996, 7 pages.

EXPANDO® Self–Fitting Protective Oversleeve by BentleyHarris, 6 page brochure (undated).

* cited by examiner

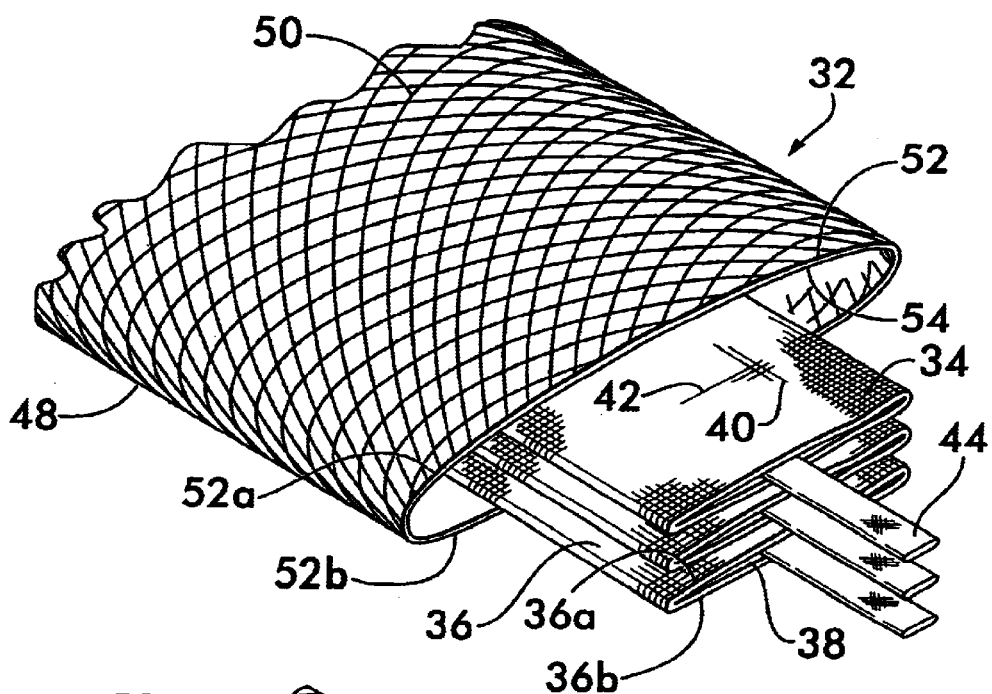

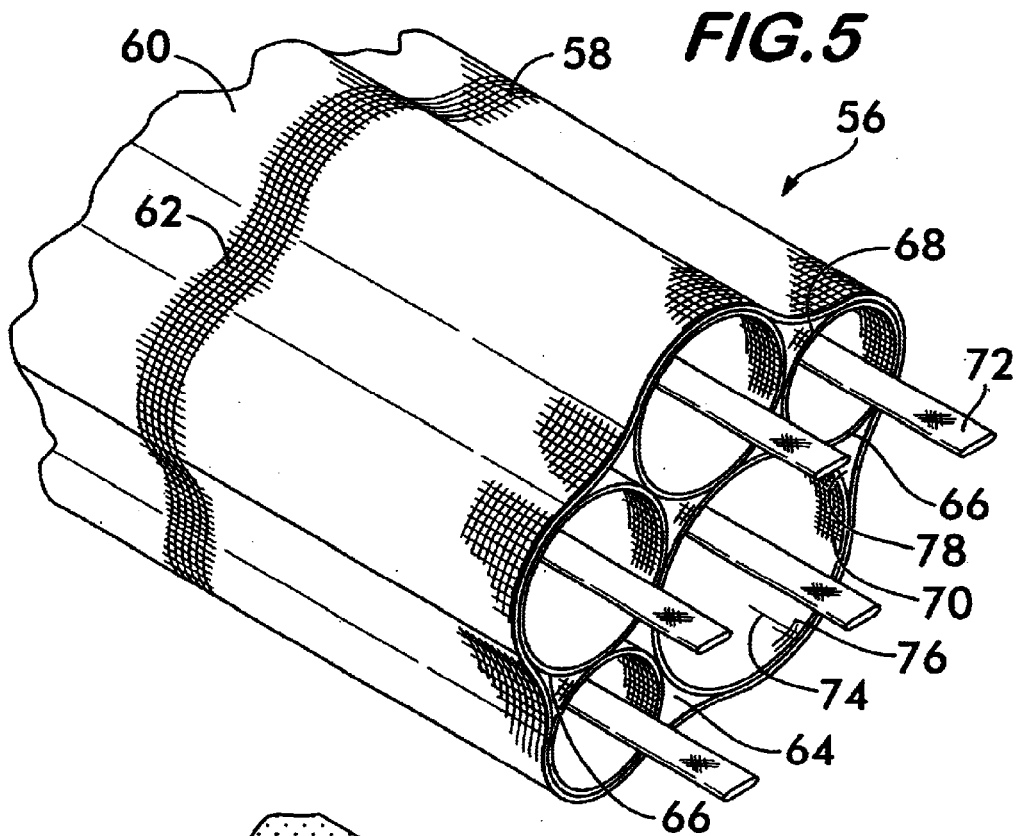
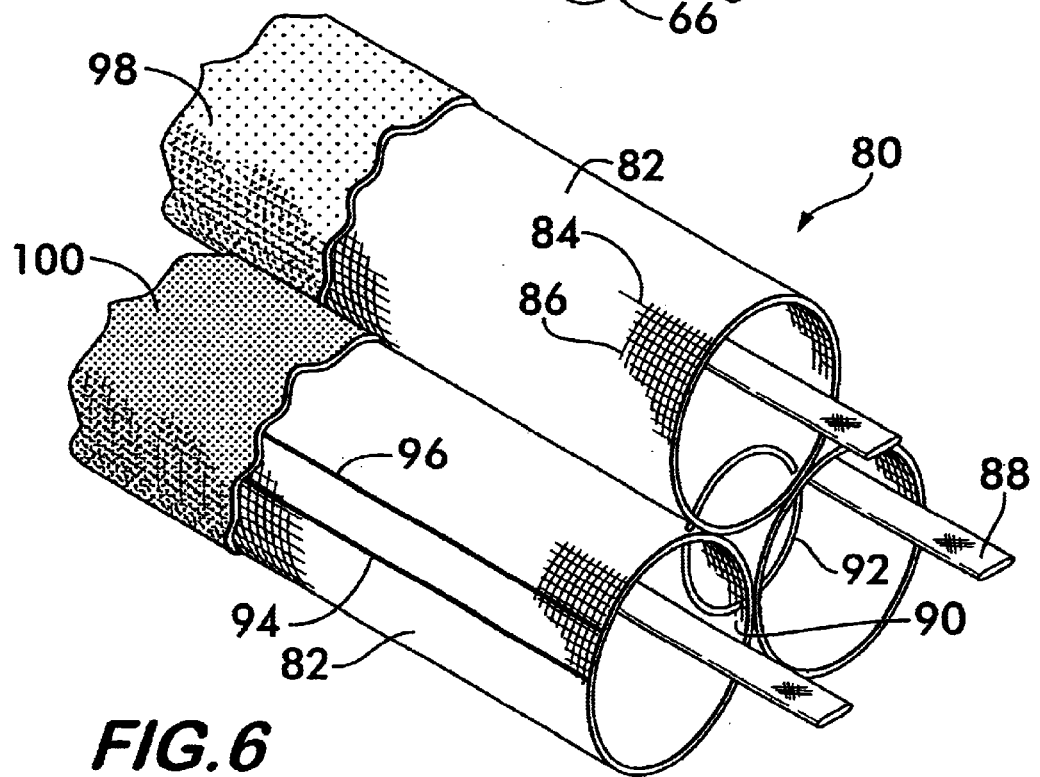

SLEEVE ASSEMBLY FOR RECEIVING ELONGATED ITEMS WITHIN A DUCT

RELATED APPLICATIONS

This application is based on and claims priority to U.S. Provisional Application No. 60/406,607, filed Aug. 28, 2002, and U.S. Provisional Application No. 60/476,939, filed Jun. 9, 2003.

FIELD OF THE INVENTION

This invention relates to sleeving and sleeve assemblies for encasing and protecting elongated items and especially to lengths of sleeving which may be simultaneously drawn through in situ duct work for later facilitating positioning of elongated items in the duct work.

BACKGROUND OF THE INVENTION

Elongated items such as wiring bundles or optical fiber cables used for telephone, video or computer communication networks are often installed in protective ducts which may be buried underground, strung from support stanchions or positioned within building structures along with other utility and service lines. Such ducts may be, for example, extruded polymer tubes which provide substantially continuous protection to the elongated items from moisture, abrasion, impact and other environmental hazards.

Once the duct is in place, for example, underground or throughout a building structure, it is difficult to position additional cables within it, for example, to increase the capacity of the communication network or replace a failed cable. When the ducts are buried underground or positioned within the structure of a building, they are accessible only at isolated node points where the network is connected to components or splices are effected. The relative inaccessibility of the duct work often precludes any attempt to use it for additional cables. New ducts are laid or installed or the existing duct work is scrapped and replaced with new ducts having increased capacity.

The duct work through which the wiring bundles or optical fiber cables are installed may also comprise the heating and air conditioning ducts within a building. Such duct work provides a convenient means for supporting and distributing the communication lines throughout the building structure.

Placement of these communication lines within the duct work is done after the duct work is installed, either during building construction or in an established building in which the facilities are being updated or augmented. Installation of the lines within existing duct work is often a difficult task since the duct work typically does not follow a straight path but winds its way throughout the building structure.

Typically, the lines must be drawn through the duct work, sometimes under considerable tensile force.

Furthermore, items, such as the aforementioned communication lines, if installed within ventilation ducts, such as air conditioning ducts, must meet the fire safety requirements of the Plenum Rating Standard established by Underwriters Laboratories. The Plenum Rating Standard UL1995 establishes minimum requirements for both flame spreading and smoke development based upon test specifications, particularly the Surface Burning Characteristics of Building Materials and assemblies, CAN/ULC-S102, and the Standard Method of Tests For Surface Burning Characteristics of Building Materials, UL 723. According to the Plenum Rating Standard, material in a compartment handling conditioned air for circulation through a duct system shall have a flame spread rating of not more than 25 and a smoke developed rating of not more than 50 when tested according to the aforementioned specifications. By adhering to such codes, greater fire safety is achieved since the elongated items within the duct work will resist burning and smoking during a fire, and the duct work will not become a means for spreading fire and smoke throughout the building.

The insulation used with electrically conducting wire and the sheathing for optical fibers typically does not meet the requirements of the Plenum Rating Standard. This would otherwise prevent positioning of such items within the air conditioning duct work of a building.

There is clearly a need for a device and a method for installing additional elongated items, such as optical fiber cables or wire bundles within in-situ ducts, which does not require access to the duct substantially along its length but will allow for relatively easy installation of additional elongated items with only access to terminal points of the duct. It is furthermore desirable that, at least for some applications, the protective sleeving meet or exceed the Plenum Rating Standard to afford greater protection to the elongated items from fire and allow them to be installed within the ventilation duct work of a building.

SUMMARY OF THE INVENTION

The invention concerns a sleeve assembly for receiving and protecting elongated items within a duct. The sleeve assembly comprises a plurality of separate and independent sleeves positioned lengthwise adjacent to one another. Each of the sleeves comprises a sidewall surrounding and defining a central space. The sidewall is formed from a plurality of warp filamentary members interwoven with a plurality of weft filamentary members. The weft filamentary members are resiliently biased radially outwardly so as to resiliently maintain the sleeve in an open configuration. A pull cord is positioned within the central space and extends lengthwise of the sleeve. The assembly further includes means for simultaneously drawing the plurality of sleeves through the duct. Preferably, the filamentary members forming the sleeves are woven in a pattern selected from the group consisting of satin, sateen and twill weaves.

In one embodiment, the sleeve assembly includes an outer jacket surrounding the plurality of sleeves and extending lengthwise there along. The jacket has an inwardly facing surface engaging the sidewalls of the sleeves. The inwardly facing surface comprises the means for simultaneously drawing the plurality of sleeves through the duct. Preferably, the filamentary members comprising the jacket are interlaced by braiding. This allows the jacket to exert an inwardly compressive force on the plurality of sleeves when it is placed under tension.

In another embodiment, the filamentary members comprising the jacket may be interlaced by weaving. The jacket is sized so as to forcibly engage the resiliently biased sidewalls of the sleeves substantially along their lengths. The jacket has a cross sectional profile substantially conforming to the sidewalls.

In another embodiment of the sleeve assembly, a loop extends transversely to the plurality of sleeves. The loop is positioned at one end of the sleeves and penetrates the sidewalls of each of sleeves. The loop comprises the means for simultaneously drawing the plurality of sleeves through the duct.

In yet another embodiment of the invention, the sleeve assembly comprises a plurality of separate and independent sleeves positioned lengthwise adjacent to one another. Each of the sleeves comprises a sidewall surrounding and defining a central space. The sidewall is formed from a plurality of warp filamentary members interwoven with a plurality of weft filamentary members. Opposing portions of the sidewall are resiliently biased into facing relation with one another such that each sleeve assumes a substantially flat configuration. The opposing sidewall portions are separable into spaced apart relation to receive the elongated items within the central space. A pull cord is positioned within the central space of each sleeve and extends lengthwise along the sleeve. The assembly further includes an outer jacket surrounding the plurality of sleeves and extending lengthwise there along. The jacket has an inwardly facing surface engaging the sidewalls of the sleeves for simultaneously drawing the plurality of sleeves through the duct. The jacket is later removable to allow the sleeves to expand to receive elongated members.

BRIEF DESCRIPTION OF THE DRAWINGS

FIG. 3 is a perspective view of another embodiment of a sleeve assembly according to the invention;

FIG. 4 is a perspective view of the sleeve embodiment shown in FIG. 3 in use;

FIG. 5 is a perspective view of yet another embodiment of a sleeve assembly according to the invention;

FIG. 6 is a perspective view of still another embodiment of a sleeve assembly according to the invention.

DETAILED DESCRIPTION OF THE EMBODIMENTS

Figure 1:
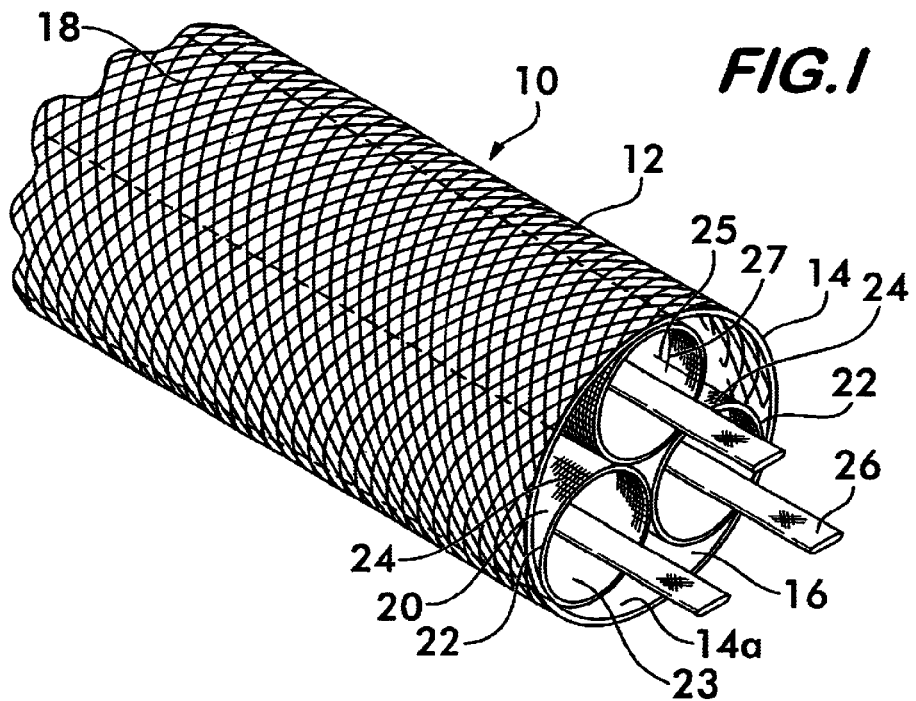
FIG. 1 is a perspective view of a sleeve assembly having a braided outer jacket according to the invention.

FIG. 1 shows an embodiment of a sleeve assembly 10 according to the invention. Sleeve assembly 10 comprises an outer jacket 12 having a sidewall 14 that surrounds a central space 16. Sidewall 14 is formed of a plurality of flexible, resilient filamentary members 18 which, for this embodiment, are interlaced together by braiding for reasons explained below. Filamentary members 18 are preferably monofilaments made of a thermoplastic polymer such as nylon, polyester, polypropylene, polytetrafluoroethylene, PEEK and PPS. Bi-component materials, such as nylon sheathed in polypropylene, are also feasible and provide monofilaments having low surface tension on the outer surface and a tough, abrasion-resistant core. Sidewall 14 may be made of one type of filamentary member or a blend of several types to achieve a combination of characteristics such as abrasion resistance, resistance to heat and low-friction coefficient. It is also feasible to form filamentary members 18 from multifilament yarns.

A plurality of separate and independent sleeves 20 are positioned within the central space 16 and oriented lengthwise along the outer jacket 12. Each sleeve 20 has a sidewall 22 which surrounds and defines a respective central space 23. Sleeves 20 are constructed of interlaced filamentary members 24, preferably consisting essentially of polyester warp monofilaments 25 and polyester weft monofilaments 27 which are interlaced by weaving for reasons explained below. The use of interlaced filamentary members for both the outer jacket 12 and sleeves 20 advantageously provides a flexible assembly which can be routed along a curving path with out kinking and collapsing.

Within each sleeve 20 is a pull cord 26, preferably in the form of a flat tape of woven or braided multifilament yarns such as polyesters or aramids, for increased tensile strength. Pull cords 26 are used to draw elongated items, such as optical fiber cables or wire bundles through the sleeves 20 when the assembly 10 is positioned within a duct as described below.

Sleeves 20 are positioned within central space 16 and are sized relatively to one another so that their sidewalls 22 are in contact with each other and with the inwardly facing surface 14a of sidewall 14 of the outer jacket 12. The weft filamentary members 27 are resiliently biased to provide sufficient radial stiffness to maintain the sleeves 20 in a substantially open configuration and resist crushing upon application of radial compressive forces by the outer jacket 12.

The resilient biasing is advantageously accomplished by the preferred construction of the sleeves 20 using weft filamentary members 27 consisting of relatively stiff polyester monofilaments which are easily biased into the desired shape and by interlacing the warp and weft monofilaments by weaving. Woven structures have generally greater radial stiffness as compared with braided or knitted structures due to the orientation of the weft filamentary members which extend in the hoop direction (circumferentially) of the sleeve and thereby provide radial stiffness due to their biasing and curvature.

Figure 2:
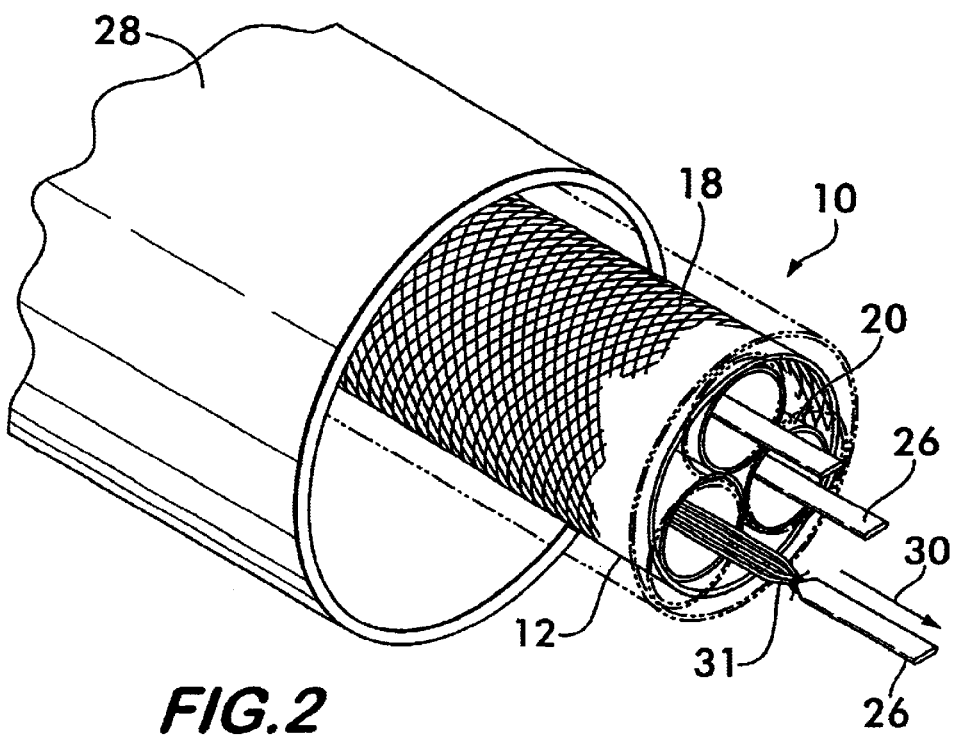
FIG. 2 is a perspective view of the sleeve assembly shown in FIG. 1 being drawn through a duct.

As noted above for this embodiment, the outer jacket 12 is braided. Braided tubular structures such as the outer jacket exhibit a characteristic known as the "trellis effect", whereby the jacket is caused to contract radially when a lengthwise tensile force is applied, stretching the jacket. Resilient biasing of the filamentary members forming the jacket cause it to spring back to a nominal diameter and length in the absence of any tensile force. By forming the outer jacket 12 from braided resilient filamentary members, it is possible to take advantage of the trellis effect and have the inner surface 14a of outer jacket 12 form a means for simultaneously drawing the sleeves 20 through a duct by pulling on the outer jacket. This is illustrated in FIG. 2, wherein the sleeve assembly 10 is drawn through a duct 28 by pulling on the outer jacket 12 of the assembly 10 in the direction of arrow 30. Tension forces are developed within the outer jacket 12 which tend to stretch it lengthwise, causing a radial contraction from a nominal diameter (shown in phantom line) to a smaller diameter due to the trellis effect. The radial contraction of the outer jacket 12 compresses its inner surface 14a against the sidewalls 22 of the sleeves 20, thereby providing a clamping action allowing the sleeves to be simultaneously drawn through the duct 28. Because the sleeves 20 are relatively stiff radially (due to their woven monofilament construction), they resist the compressive force and are drawn along with the outer jacket 12 through the duct 28. Upon release, the resilient biasing of the filaments 18 comprising the outer jacket force the jacket back to its original diameter and length. Once the sleeve assembly 10 is positioned in the duct 28, the pull cords 26 may be used to draw elongated items 31, such as optical fiber bundles, through the sleeves 20 to form or augment a communication network.

In one preferred embodiment of the sleeve assembly 10, both the warp and weft filamentary members 25 and 27 forming the sleeves 20 are interwoven using a weave pattern characterized by "floats" of either warp or weft filamentary members on the inner surface of the sleeves. A filamentary member is said to "float" when it is not interwoven alternately with each cross filamentary member, but skips two or more cross filamentary members before being interwoven. Weaves using floats include twill, satin and sateen weaves. In twill and satin weaves, the warp filamentary members float over the weft filamentary members, whereas in the sateen weave, the weft filamentary members float over the warp filamentary members. Satin weaves are characterized by having longer floats than twills. In general twill, satin and sateen weaves are favored because they provide a durable fabric which resists wear and abrasion and provides a smooth surface with low friction. The floats are preferably positioned on the inner surface of the sleeves to allow elongated items to be drawn more easily through the central space 23 when such items are being installed within the sleeves.

In a particular embodiment using polyester warp and weft filamentary members in one of the weaves mentioned above, the warp filamentary members are monofilaments having a diameter of about 0.35 mm, the weft filamentary members are also monofilaments having a diameter of about 0.25 mm, and the sleeves 20 have a weave density of 25 to 35 dents per inch by 25 to 35 picks per inch.

Alternately, the warp and weft filamentary members 25 and 27 may comprise materials such as nylon, polypropylene as well as other polymers. To meet the requirements necessary to achieve the Plenum Rating Standard allowing the sleeve assembly 10 to be installed in building ventilation duct work, filamentary members having significant resistance to heat, fire and the propensity not to give off smoke when burning are useful.

In a plenum rated embodiment of sleeve assembly 10, the jacket filamentary members 18 and the warp filamentary members 25 are preferably monofilaments comprising polyphenylene sulfide. If higher strength is required, then the filamentary members 18 and 25 may comprise monofilament aramids such as KEVLAR®, either alone or in combination with the polyphenylene sulfide monofilaments.

In fire-resistant sleeves, the weft filamentary members 27 preferably comprise polyphenylene sulfide, either as monofilaments or multifilament yarns. When used with warp filamentary members 25 of polyphenylene sulfide or an aramid as described above, the combination is expected to yield a non-halogenated sleeve which meets the desired plenum rating. Halogenated materials, such as fluorinated polymers, have been effective in the past in achieving the desired plenum rating, however, such compounds are disadvantageous because they produce noxious gases when they burn.

In another embodiment, the weft filamentary members 27 comprise fire resistant aramids such as NOMEX® combined with warp filamentary members 25 of polyphenylene sulfide. Alternately, halogenated compounds such as polyvinylidene fluoride (KYNAR®) and copolymers of ethylene and chlorotrifluoroethylene (HALAR®) may be used for the weft filamentary members 27.

FIGS. 3 and 4 illustrate yet another embodiment of a sleeve assembly 32 according to the invention. Sleeve assembly 32 comprises a plurality of separate and independent sleeves 34. Each sleeve 34 comprises a sidewall 36 surrounding a central space 38, the sidewall 36 preferably being woven from warp and weft filamentary members 40 and 42. Unlike the previous embodiment, opposing portions 36a and 36b of the sidewalls 36 are biased into facing relation with one another to assume a substantially flattened configuration. As shown in FIG. 4, pull cords 44 are positioned within the central spaces 38 of sleeves 34 to permit elongated items 46, such as an optical fiber cable, to be drawn through the sleeve once it is positioned within a duct. The opposing sidewall portions 36a and 36b of sleeves 34 are resiliently separable into spaced apart relation to receive the elongated items within the central space.

Sleeves 34 are held together as a group using an outer jacket 48. Jacket 48 is formed of interlaced filamentary members 50, preferably braided together, although weaving is also feasible. Similar to sleeves 34, jacket 48 comprises a sidewall 52 having opposing portions 52a and 52b biased into facing relation to assume a substantially flattened configuration. The flattened configuration of jacket 48 and sleeves 34 saves space within the conduit and also provides flexibility to the assembly 32, facilitating its passage through a duct or conduit crowded with other cables and obstructions. The flexibility allows the assembly 32 to be bent, curved and otherwise manipulated as required to conform to the path through the conduit. The flattened profile occupies a relatively small volume within the conduit, thereby leaving more room for cables and other components.

The jacket 48 protects the sleeves 34 from abrasion due to frictional contact as the assembly 32 is drawn through the duct. It is, thus, advantageous to use filamentary members 50 which have good abrasion resistance, high melting points and low friction coefficients. To that end, filamentary members 50 are preferably comprised of a thermoplastic. Materials such as polypropylene, nylon, polyester or bi-component filaments are feasible.

When braided, the jacket 48 may be used to draw the sleeve assembly 32 through a duct. The trellis effect, described above, will cause the jacket 48 to decrease in diameter when subjected to a tensile load, its inwardly facing surface 54 gripping the sleeves 34 with a compressive radial force. Similar to the previous embodiment, the inwardly facing surface 54 of the jacket 48 comprises a means for drawing the plurality of sleeves 34 simultaneously through a duct.

As shown in FIG. 4, the opposing portions 36a and 36b of sidewall 34 and the opposing portions 52a and 52b of jacket 48 are resiliently separable when an elongated item 46 is drawn through the sleeve 34 using a pull cord 44. Preferably, jacket 48 is sized to allow full use of all of the sleeves which it ensheaths. Alternatively, once the sleeves 34 are positioned within a duct the jacket 48 may be removed by sliding it over the sleeves, leaving the sleeves 34 free within the duct so that their opposing sidewall portions 36a and 36b may separate without restraint.

FIG. 5 shows an alternate embodiment of a sleeve assembly 56 according to the invention. Sleeve assembly 56 comprises an outer jacket 58 having a sidewall 60 formed from a plurality of interlaced filamentary members 62. Filamentary members 62 are preferably formed of thermoplastic polymers as described above and are interlaced by weaving for reasons explained below. Sidewall 60 surrounds and defines a central space 64 adapted to receive a plurality of separate and independent sleeves 66. Sleeves 66 have sidewalls 68 formed from a plurality of resilient, flexible interlaced filamentary members 70, preferably monofilaments also made from thermoplastic polymers. Each sleeve 66 has a pull cord 72 similar to the cord 26 described above.

Sleeves 66 are preferably woven from warp and weft filamentary members 74 and 76, the weft filamentary members being biased to provide radial stiffness resisting compression forces as described previously. Weaves such as twill, satin and sateen are again preferred for the sleeves 66. In sleeve assembly embodiment 56, the outer jacket 58 is also woven and encapsulates the sleeves 66, which maintain a substantially open configuration due to their woven monofilament construction which provides radial stiffness. Outer jacket 58 is sized so as to conform closely to the sidewalls 68 of the sleeves 66 and forcibly engage them with an inwardly facing surface 78. This inwardly facing surface 78 of sidewall 60 comprises a means for simultaneously drawing the plurality of sleeves 66 through a duct. A woven outer jacket 58 is preferred because it has significant radial stiffness to maintain an inward radial force on the sleeves 66. Filamentary members 62 forming the jacket 58 may comprise heat shrinkable fibers which will allow it to develop a cross-sectional profile that substantially conforms to the sidewalls 68 of sleeves 66 as illustrated in FIG. 5.

Woven jackets 58 are further advantageous in certain embodiments because they provide readily controllable interstices between the filamentary members 62 comprising the jacket, the interstices providing regions for holding lubricants to reduce friction during the pull through the duct. It is also possible to remove a woven jacket from the duct by pulling it over the sleeves 66, leaving the sleeves in place within a duct.

FIG. 6 shows another embodiment of a sleeve assembly 80 according to the invention. Sleeve assembly 80 comprises a plurality of separate and independent sleeves 82 formed of interlaced warp and weft filamentary members 84 and 86. The warp and weft filamentary members 84 and 86 are preferably thermoplastic monofilaments woven in a twill, satin or sateen weave, wherein the weft filamentary members 86 are biased to provide radial stiffness to maintain the sleeves 82 in an open configuration. Pull cords 88 are positioned within each sleeve 82. The sleeves 82 are joined together at one end 90 allowing them to be drawn simultaneously as a group through a duct. Any practical means for simultaneously drawing the tubes 82 through a duct may be used. For example, the tubes may be cinched, sutured or taped together. By way of example, a loop 92 is shown passing through and attaching the tubes together. Loop 92 provides a convenient point for attaching a line or pull tool to draw the sleeve assembly 80 through a duct. The loop 92 may take the form of a flexible wire or a rigid ring.

Weaving of the sleeves in the various embodiments is further advantageous because it permits additional components to be easily incorporated into the sleeves. As shown by way of example in FIG. 6, such additional components include detection wires 94 and trace yarns 96 interwoven as warp yarns within sleeves 82, it being understood that these components may be present in all of the embodiments disclosed herein. Detection wires 94 are preferably nickel clad copper wires or some other electrical conductor which allow the sleeve assembly to be detected remotely by electrical means, such as by induction or by radio frequency emissions, when the assembly is otherwise not visible and inaccessible within a duct. The presence of detection wires 94 enables the installers to monitor the progress of a multi-tube assembly through a conduit by, for example, sending electrical signals through the wires and remotely detecting those signals to determine the presence and location of a failure of the assembly when one occurs.

Trace yarns 96 comprise yarns or filaments having a color that contrasts with the warp and weft filamentary members 84 and 86 comprising the sleeve 82. A different color trace yarn 96 is woven into each sleeve 82 and is used to differentiate the sleeves at their terminal points. It is possible to readily distinguish between multiple sleeves 82 in an assembly when each tube has a different color trace yarn. This is an important feature when one has access only to the ends of a relatively long sleeve assembly and must draw the pull cords which are actually attached to optical fibers in order to position them within one of the sleeves of the assembly. Without a means for positively identifying and distinguishing one sleeve from another in an assembly, there is a much greater chance that the wrong pull cords may be withdrawn, leaving useless sleeves within a conduit which will need to be replaced.

While twill, satin and sateen weaves are preferred for constructing sleeves of the sleeve assembly, plain weaves are also useful because the density and porosity of plain weaves may be controlled relatively easily to good advantage. In a practical example, sleeves 82 are woven using 0.35 mm diameter polypropylene warp filaments and 0.25 mm polypropylene fill filaments with a weave density of 25 to 35 dents per inch and 25 to 32 picks per inch. Such a weave will allow interstices to form in the sleeve 82, the interstices being useful to hold viscous or dry lubricants enabling the sleeve assembly 80 to slide within a duct more easily and reduce friction during installation. The weave density may also be increased so as to make a substantially air-impermeable sleeve, allowing it to be forced through the duct by compressed air techniques. The sleeves 82 may also be coated with a flexible impermeable polymer membrane 98 (see FIG. 6) to ensure fluid tightness. It may also be desirable to coat the sleeve 82 with coatings 100 of zinc compounds to prevent rot, mildew, chemical attack and make the assembly unappetizing to vermin which have a propensity to gnaw on buried cables.

Figure 7:
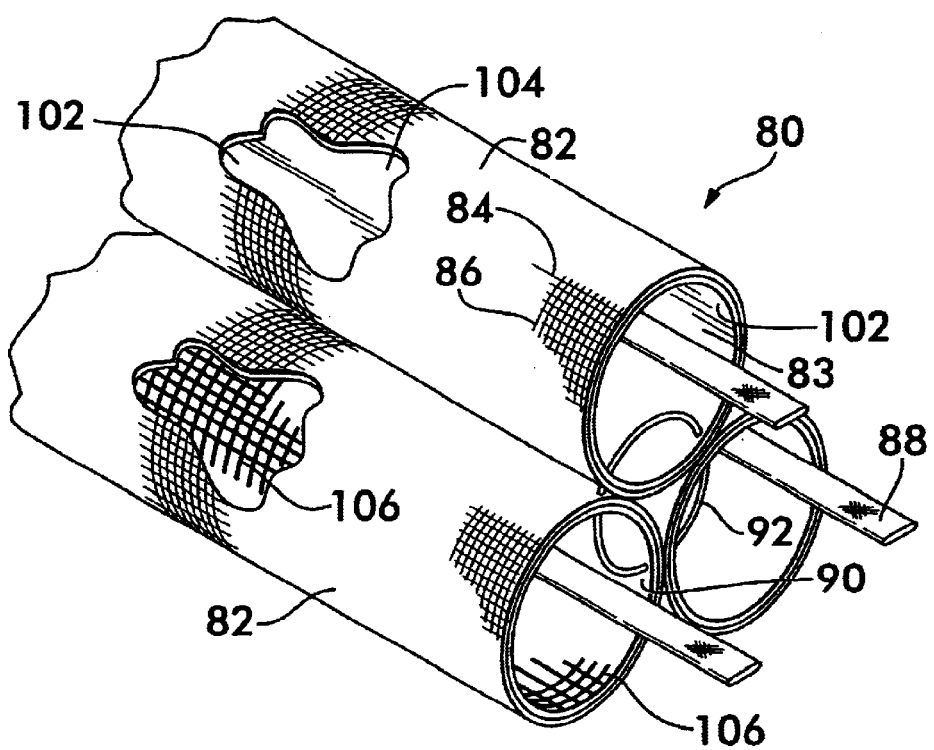
FIG. 7 is a perspective view of the embodiment shown in FIG. 6 having additional components.

If the elongated items positioned within sleeves 82 carry electrical currents, it may be desirable to shield these items from electromagnetic interference (EMI). The items themselves may be a source of EMI adversely affecting other electrical current carriers, in which case it is desirable to isolate them. As shown in FIG. 7, the sleeve assembly 80 may serve as a shield/isolator of EMI by the incorporation of a conducting layer 102 substantially surrounding the central space 83 surrounded by each sleeve 82. Conducting layer 102 may comprise a layer of metal foil 104 (preferably aluminum) or may comprise a mesh of conductors 106. Conductors 106 may be interwoven with the warp and fill yarns 84 and 86 or take the form of a distinct layer attached to the sleeves 82. The conductors 106 may, for example, comprise selected warp and fill yarns coated with a conductor, such as silver or copper, and be in electrical contact substantially along the length and width of the sleeve 82. Upon grounding of the conducting layer 102, it will serve to shield or isolate the items within the sleeve assembly 80 from EMI.

The materials used to construct any embodiment of the sleeve assembly according to the invention should have characteristics compatible with the method of installation, which requires that the sleeve assembly be drawn through a long duct or conduit. During this process, the components of the assembly will rub against other surfaces, for example, other cables, conduit walls and fittings. Thus, the material should have: (1) an acceptable coefficient of friction to allow it to slide easily over adjacent contacting surfaces; (2) an advantageous wrinkle recovery angle allowing it to resiliently take its nominal shape after kinking; (3) a relatively high melting point to prevent fusing due to friction induced heating caused by relative motion of contacting surfaces; and (4) relatively high abrasion resistance to prevent "rope burn" and abrasion wear. The polymer materials mentioned above as comprising the sleeves and jackets are generally compatible with these requirements.

The sleeve assembly according to the invention provides a convenient and versatile device for positioning and protecting elongated members within in-situ ducting for which accessibility is limited. The device allows communication networks using optical fibers or conventional wires to be readily constructed and augmented.

What is claimed is:

1. A sleeve assembly for receiving and protecting elongated items within a duct, said sleeve assembly comprising:

a plurality of separate and independent sleeves positioned lengthwise adjacent to one another, each said sleeve comprising:

a sidewall surrounding and defining a central space, at least one of said sidewalls having a weave density of 25 to 35 dents per inch by 25 to 35 picks per inch, said sidewall being formed from a plurality of warp filamentary members interwoven with a plurality of weft filamentary members, said warp and said weft filamentary members consisting essentially of polyester monofilaments, said weft filamentary members being resiliently biased radially outwardly so as to resiliently maintain said sleeve in an open configuration, said ware monofilaments have a diameter of about 0.35 mm, said weft monofilaments have a diameter of about 0.25 mm;

a pull cord positioned within said central space and extending lengthwise of said sleeve; and said assembly further including means for simultaneously drawing said plurality of sleeves through said duct.

2. A sleeve assembly according to claim 1, further comprising an outer jacket surrounding said plurality of sleeves and extending lengthwise there along, said jacket having an inwardly facing surface engaging said sidewalls of said sleeves, said inwardly facing surface comprising said means for simultaneously drawing said plurality of sleeves through said duct.

3. A sleeve assembly according to claim 2, wherein said jacket comprises a plurality of interlaced filamentary members.

4. A sleeve assembly according to claim 3, wherein said filamentary members comprising said jacket are interlaced by weaving, said jacket being sized so as to forcibly engage said resiliently biased sidewalls of said sleeves substantially along their lengths, said jacket having a cross-sectional profile substantially conforming to said sidewalls.

5. A sleeve assembly according to claim 1, wherein said filamentary members are woven in a pattern selected from the group consisting of satin, sateen and twill weaves.

6. A sleeve assembly according to claim 1, wherein one of said warp and said weft filamentary members comprise polyester.

7. A sleeve assembly according to claim 6, wherein one of said warp and said weft filamentary members further comprise nylon.

8. A sleeve assembly according to claim 6, wherein one of said warp and said weft filamentary members further comprise polypropylene.

9. A sleeve assembly according to claim 1, wherein said warp and weft filamentary members comprise aramid filaments selected from the group consisting of nylon, polyphenylene sulfide, polyvinylidene fluoride, and copolymers of ethylene and chlorotrifluoroethylene.

* * * * *